(12) United States Patent
Chen (10) Patent No.: US 11,327,614 B2
(45) Date of Patent: May 10, 2022

(54) FINGERPRINT RECOGNIZABLE TOUCH DISPLAY PANEL

(71) Applicant: Wuhan China Star Optoelectronics Semiconductor Display Technology Co., LTD., Hubei (CN)

(72) Inventor: Bi Chen, Wuhan (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 181 days.

(21) Appl. No.: 16/622,075

(22) PCT Filed: Aug. 28, 2019

(86) PCT No.: PCT/CN2019/103072
§ 371 (c)(1),
(2) Date: Dec. 12, 2019

(87) PCT Pub. No.: WO2021/003815
PCT Pub. Date: Jan. 14, 2021

(65) Prior Publication Data
US 2021/0326002 A1   Oct. 21, 2021

(30) Foreign Application Priority Data

Jul. 5, 2019   (CN) .......................... 201910604711.2

(51) Int. Cl.
*G06F 3/044*       (2006.01)
*G06F 3/041*       (2006.01)
*G06F 3/047*       (2006.01)

(52) U.S. Cl.
CPC ............ *G06F 3/0445* (2019.05); *G06F 3/047* (2013.01); *G06F 3/0412* (2013.01);
(Continued)

(58) Field of Classification Search
CPC .. G06F 3/0445; G06F 3/0446; G06F 3/04164; G06F 3/0448; G06F 3/0412; G06F 3/047; G06F 2203/04111
(Continued)

(56) References Cited

U.S. PATENT DOCUMENTS

2016/0232395 A1\* 8/2016 Han ........................ G06F 3/048
2017/0032164 A1   2/2017 Liu et al.
(Continued)

FOREIGN PATENT DOCUMENTS

CN   105159506 A      12/2015
CN   106802747 A  \*   6/2017
(Continued)

*Primary Examiner* — Mark Edwards
(74) *Attorney, Agent, or Firm* — Benesch, Friedlander, Coplan & Aronoff LLP (57) ABSTRACT

A fingerprint recognizable touch display panel includes a display panel, a touch layer, and a fingerprint recognizing layer disposed in the touch area. The touch layer includes touch driving electrodes and touch sensing electrodes. The fingerprint recognizing layer includes first fingerprint recognizing electrodes and second fingerprint recognizing electrodes. The first fingerprint recognizing electrodes and the second fingerprint recognizing electrodes do not overlap with the touch driving electrodes. When touch control function is implemented, the first fingerprint recognizing electrodes and the second fingerprint recognizing electrodes are both multiplexed to touch driving electrodes.

16 Claims, 6 Drawing Sheets

(52) U.S. Cl.
CPC .......... *G06F 3/0446* (2019.05); *G06F 3/0448* (2019.05); *G06F 3/04164* (2019.05); *G06F 2203/04111* (2013.01)

(58) Field of Classification Search
USPC ........................................................ 345/173
See application file for complete search history.

(56) References Cited

U.S. PATENT DOCUMENTS

2017/0160819 A1\* 6/2017 Yi ...................... G06F 3/04164
2018/0307884 A1 10/2018 Xu et al.

FOREIGN PATENT DOCUMENTS

| | | |
|---|---|---|
| CN | 106802747 A | 6/2017 |
| CN | 107122080 A | 9/2017 |
| CN | 108475323 A | 8/2018 |
| CN | 109871148 A | 6/2019 |

\* cited by examiner

FINGERPRINT RECOGNIZABLE TOUCH DISPLAY PANEL

FIELD OF INVENTION

The present disclosure relates to the field of touch sensing technologies, particularly to a fingerprint recognizable touch display panel.

BACKGROUND OF INVENTION

With the development of display technology, mobile phones are important communication facilities and essential in daily life. Maximizing display areas and integrating fingerprint recognition into the display areas of panel become the target development of display technology. In conventional technologies, fingerprint recognition is implemented by a separate module in disposed in non-display area, such as in an area at lower border in the front, lateral side of panel, in an area on the back of panel. The fingerprint recognitions of the above schemes are assembled as a separate module. These fingerprint recognitions require spaces occupied parts of mobile phone modules, thus the overall display areas ratio of panels and the internal spaces of the whole apparatuses are affected.

SUMMARY OF INVENTION

The present disclosure provides a fingerprint recognizable touch display panel which integrates the fingerprint sensing circuit inti the touch control circuit to solve problems of existing display panels. Fingerprint recognitions of the existing display panels are separated module disposed in the non-display area of the panel. As a result, the fingerprint recognition modules occupy certain spaces so that ratios of the display area of panel are affected and increasing display area ratios of display panels and developing full-screen display panels are conducive.

In order to solve the above problems, the technical solutions provided by the present disclosure are as follows.

the present disclosure provides a fingerprint recognizable touch display panel comprising a touch area defined on the display panel, a touch layer disposed in the touch area of the display panel, a fingerprint recognizing layer dispose in the touch area of the display panel, and a touch control circuit board and a fingerprint recognizing control circuit board both disposed in a bezel area of the display panel. The touch layer comprises a plurality of touch driving electrodes arranged in a first direction and a plurality of touch sensing electrodes arranged in a second direction. The fingerprint recognizing layer comprises a plurality of first fingerprint recognizing electrodes arranged in the first direction and a plurality of second fingerprint recognizing electrodes arranged in the second direction. The first fingerprint recognizing electrodes and the second fingerprint recognizing electrodes do not overlap along a thickness direction of the display panel, and the first fingerprint recognizing electrodes and the second fingerprint recognizing electrodes are both multiplexed into the touch driving electrodes in response to a touch function being operated. The first fingerprint recognizing electrodes and the second fingerprint recognizing electrodes are disposed on a same layer, the first fingerprint recognizing electrodes cross to the second fingerprint recognizing electrodes, and the first fingerprint recognizing electrodes are split at crossing points crossing to the second fingerprint recognizing electrodes.

In an embodiment of the present disclosure, the first fingerprint recognizing electrodes, the second fingerprint recognizing electrodes, and the touch driving electrodes are disposed on a same layer.

In an embodiment of the present disclosure, the first fingerprint recognizing electrodes and the second fingerprint recognizing electrodes are disposed on a layer different from the touch driving electrodes, and the first fingerprint recognizing electrodes and the second fingerprint recognizing electrodes are disposed close to a light-emitting side of the display panel.

In an embodiment of the present disclosure, the touch driving electrodes are disposed on a layer different from the touch sensing layer electrodes.

In an embodiment of the present disclosure, the fingerprint recognizable touch display panel further comprises a bridging layer comprising a plurality of bridging wires arranged in an array and configured to connect the first fingerprint recognizing electrodes split at the crossing points In an embodiment of the present disclosure, the fingerprint recognizable touch display panel further comprises In an embodiment of the present disclosure, a plurality of first peripheral wires and a plurality of second peripheral wires, the first peripheral wires are configured to connect the touch driving electrode and the touch sensing electrodes to the touch control circuit board, and the second peripheral wires are configured to connect the first fingerprint recognizing electrodes and the second fingerprint recognizing electrodes to the fingerprint recognizing circuit board.

In an embodiment of the present disclosure, the touch control circuit board and the fingerprint recognizing circuit board are disposed in the bezel area of different sides of the display panel.

In an embodiment of the present disclosure, shapes of the first fingerprint recognizing electrodes, the second fingerprint recognizing electrodes, the touch driving electrodes, and the touch sensing electrodes are rhombuses or bars.

The present disclosure further provides another fingerprint recognizable touch display panel comprises a touch area defined on the display panel, a touch layer disposed in the touch area of the display panel, a fingerprint recognizing layer dispose in the touch area of the display panel. The touch layer comprises a plurality of touch driving electrodes arranged in a first direction and a plurality of touch sensing electrodes arranged in a second direction. The fingerprint recognizing layer comprises a plurality of first fingerprint recognizing electrodes arranged in the first direction and a plurality of second fingerprint recognizing electrodes arranged in the second direction. The first fingerprint recognizing electrodes and the second fingerprint recognizing electrodes do not overlap along a thickness direction of the display panel, and the first fingerprint recognizing electrodes and the second fingerprint recognizing electrodes are both multiplexed into the touch driving electrodes in response to a touch function being operated.

In an embodiment of the present disclosure, the first fingerprint recognizing electrodes, the second fingerprint recognizing electrodes, and the touch driving electrodes are disposed on a same layer.

In an embodiment of the present disclosure, the first fingerprint recognizing electrodes and the second fingerprint recognizing electrodes are disposed on a layer different from the touch driving electrodes, and the first fingerprint recognizing electrodes and the second fingerprint recognizing electrodes are disposed close to a light-emitting side of the display panel.

In an embodiment of the present disclosure, the touch driving electrodes are disposed a layer different from the touch sensing layer electrodes.

In an embodiment of the present disclosure, the first fingerprint recognizing electrodes and the second fingerprint recognizing electrodes are disposed on a same layer, the first fingerprint recognizing electrodes cross to the second fingerprint recognizing electrodes, and the first fingerprint recognizing electrodes are split at crossing points crossing to the second fingerprint recognizing electrodes.

In an embodiment of the present disclosure, the fingerprint recognizable touch display panel further comprises a bridging layer comprising a plurality of bridging wires arranged in array and configured to connect the first fingerprint recognizing electrodes split at the crossing points.

In an embodiment of the present disclosure, the fingerprint recognizable touch display panel further comprises a touch control circuit board and a fingerprint recognizing control circuit board both disposed in a bezel area of the display panel.

In an embodiment of the present disclosure, the fingerprint recognizable touch display panel further comprises a plurality of first peripheral wires and a plurality of second peripheral wires, the first peripheral wires are configured to connect the touch driving electrode and the touch sensing electrodes to the touch control circuit board, and the second peripheral wires are configured to connect the first fingerprint recognizing electrodes and the second fingerprint recognizing electrodes to the fingerprint recognizing circuit board.

In an embodiment of the present disclosure, the touch control circuit board and the fingerprint recognizing circuit board are disposed in the bezel area of different sides of the display panel.

In an embodiment of the present disclosure, shapes of the first fingerprint recognizing electrodes, the second fingerprint recognizing electrodes, the touch driving electrodes, and the touch sensing electrodes are rhombuses or bars.

The beneficial effects of the present disclosure are improving display area ratio of the display panel and avoiding affection of fingerprint recognition and the touch function by integrating the fingerprint recognition circuit into the touch control circuit and using the fingerprint recognition electrode as a part of the touch driving electrode.

DESCRIPTION OF DRAWINGS

In order to more clarify embodiments or technical solutions of the present technologies, the required drawings of the embodiments or the technical solutions will be briefly described below. Obviously, the drawings in the following description are merely parts of embodiments. Additional drawings may be obtained by a skilled person in the art without creative effort according to the following drawings

DETAILED DESCRIPTION OF PREFERRED EMBODIMENTS

The following description of the various embodiments is provided with reference of drawings to illustrate specific embodiments. Directional terms mentioned in the present disclosure, such as upper, lower, front, back, left, right, inside, outside, lateral, etc., are only reference of the direction of the drawing. Therefore, the directional term used to describe and clarify the present disclosure should not be viewed as limitations the present disclosure. In the drawing, structurally similar elements are denoted by the same reference numbers.

In the existing display panel, because fingerprint recognitions are separate modules in the non-display area of the panels, the fingerprint recognition module occupies a certain space. As a result, ratios of the display area of panel are affected and increasing display area ratios of display panels and developing full-screen display panels are conducive. This embodiment can solve the problems.

Figure 1:
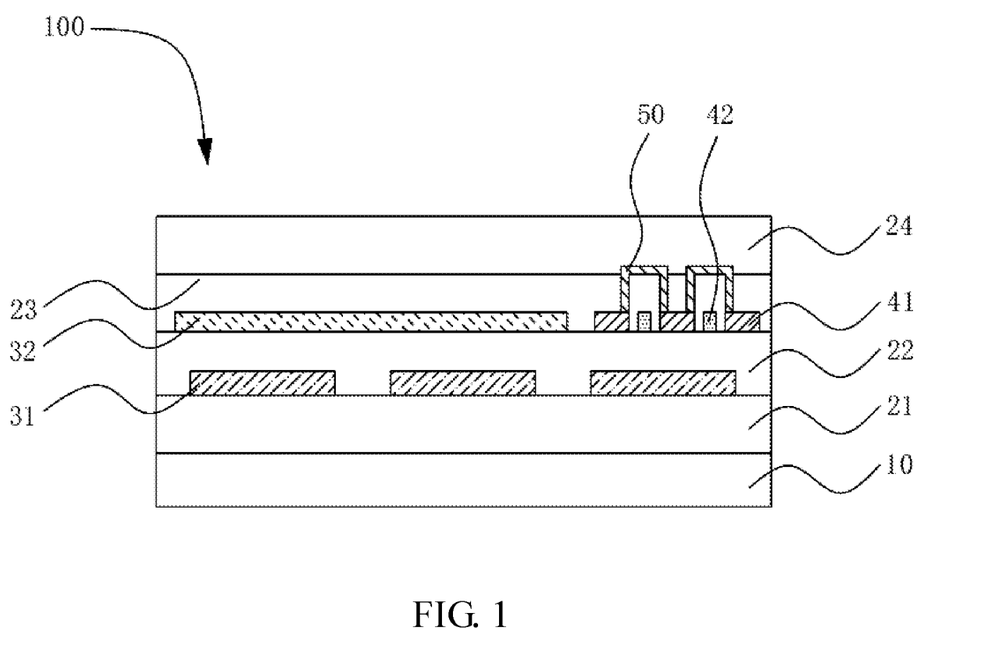
FIG. 1 illustrates a structural diagram of a touch display device of an embodiment of the present disclosure.
Figure 2:
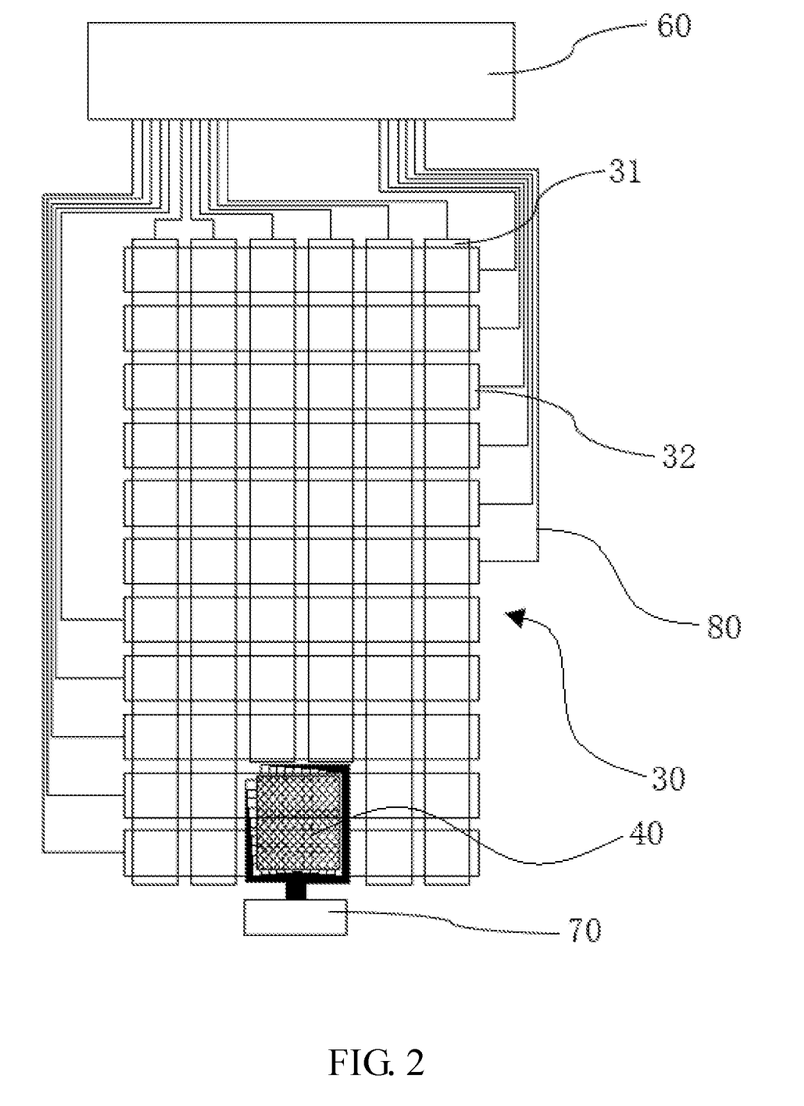
FIG. 2 illustrates a structural diagram of a touch layer of the embodiments of the present disclosure.

As shown in FIG. 1 and FIG. 2, the present embodiment provides a fingerprint recognizable touch display panel 100 including a display panel 10, a touch layer 30 disposed on the display panel 10, and a fingerprint recognizing layer 40 disposed on the display panel 10.

The touch control function in this embodiment is an on-cell (which integrates the touch function on the display panel) structure. Therefore, the touch layer 30 is disposed on the display panel 10. In other embodiments, the touch control function can be integrated inside the display panel 10, such as an in-cell structure. The display panel 10 can be a liquid crystal display panel or an organic light-emitting diode display panel, etc. which is not limited herein.

A touch area is defined on the display panel 10, and the touch layer 30 is disposed in the touch area. The touch area also corresponds to the display area of the display panel 10.

The touch layer includes a plurality of touch driving electrodes 32 and a plurality of touch sensing electrodes 31. The touch driving electrodes 32 and the touch sensing electrodes are arranged in different layers. The plurality of touch driving electrodes 32 are arranged in a first direction. The plurality of touch sensing electrodes 31 are arranged in a second direction.

The first direction and the second direction are perpendicular to each other. The first direction is longitudinal, and the second direction is horizontal.

In other embodiments, the first direction can be horizontal direction and the second direction can be longitudinal.

Shapes of the touch driving electrodes 32 and the touch sensing electrodes 31 are bars.

Figure 6:
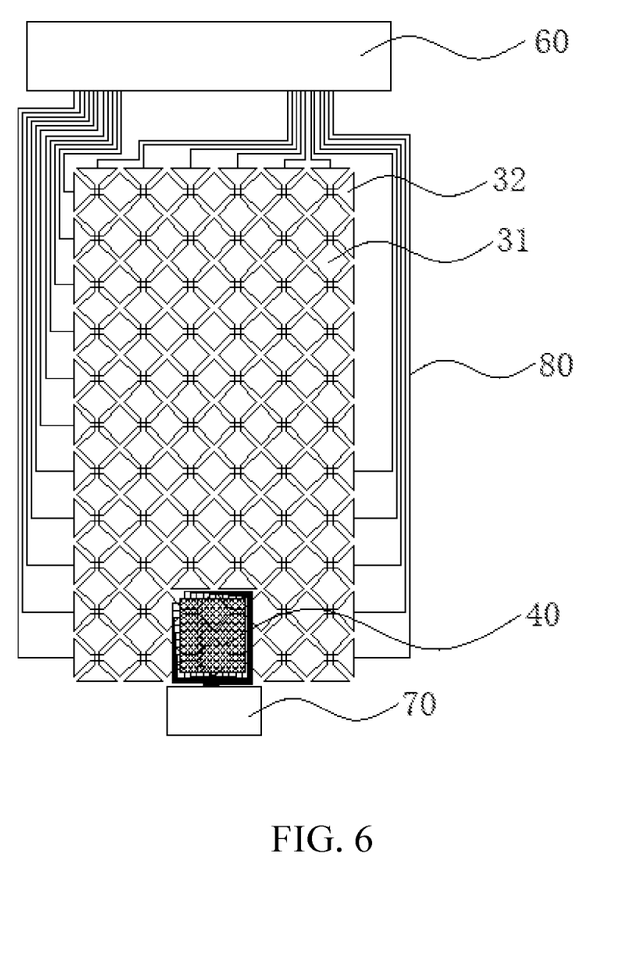
FIG. 6 illustrates a structural diagram of a fingerprint recognizing layer of the other embodiments of the present disclosure.

In other embodiments, as shown in FIG. 6, the touch driving electrodes 32 arranged in the first direction (longitudinal direction) are a plurality of interconnected rhombuses and the touch sensing electrodes 31 arranged in the second direction (lateral direction) are interconnected rhombuses.

Figure 3:
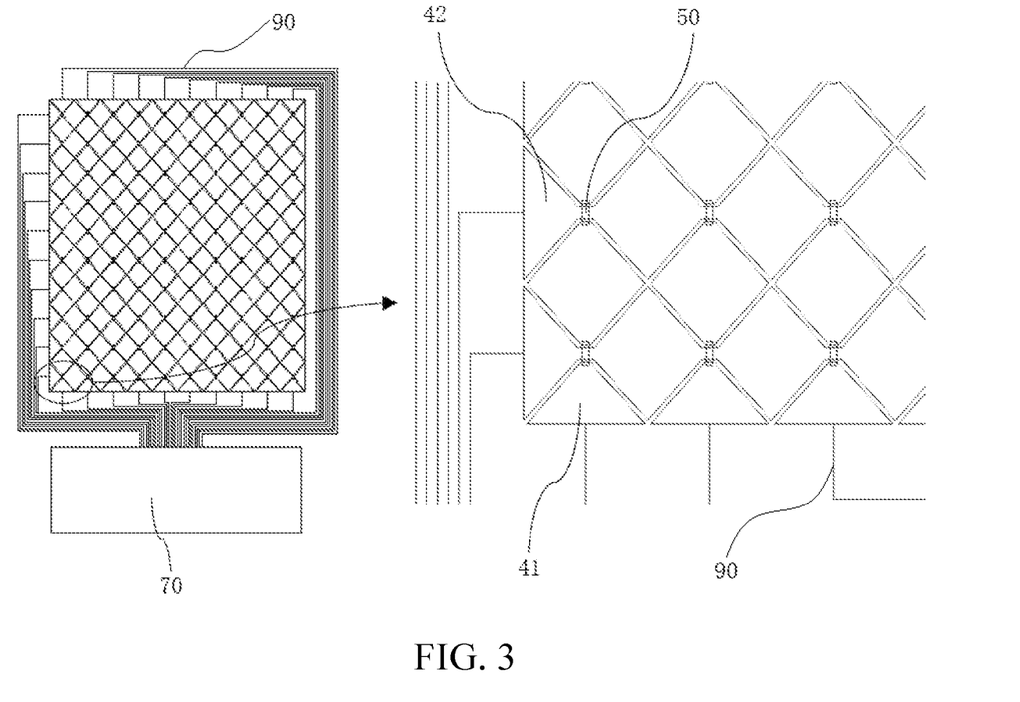
FIG. 3 illustrates a structural diagram of a fingerprint recognizing layer of the embodiments of the present disclosure.

As shown in FIG. 3, the fingerprint recognizing layer 40 includes a plurality of first fingerprint recognizing electrodes 41 and a plurality of second fingerprint recognizing electrodes 42. The plurality of the first fingerprint recognizing electrodes 41 are arranged along the first direction (longitudinal direction). The plurality of the second fingerprint recognizing electrodes 42 are arranged along the second direction (horizontal direction).

Because the fingerprint recognition functions in the present technologies are disposed as separate modules in non-display areas of the display panels, such as a lower border of bezel, a lateral edge, or a back side of the display panel, the display area ratio and the internal space of the whole apparatuses are affected.

Therefore, the present embodiment improves the fingerprint recognizing layer 40 by integrating the fingerprint recognizing layer 40 in the touch layer 30 and disposing the first fingerprint recognizing electrodes 41 and the second fingerprint recognizing electrodes 42 in the display area of touch control panel.

The first fingerprint recognizing electrodes and the second fingerprint recognizing electrodes do not overlap along a thickness direction of the display panel. That is, the touch driving area 32 is disposed in the touch area where the first fingerprint recognizing electrodes 41 and the plurality of the second fingerprint recognizing electrodes 42 are located. The advantage is when the touch control sensing function is implemented, the first fingerprint recognizing electrodes 41 and the second fingerprint recognizing electrodes 42 in the region where the fingerprint recognizing layer 40 is located are multiplexed to a touch driving electrode. That is, the fingerprint recognition circuit can serve as a touch driving electrode in the touch control circuit of the fingerprint recognition area to charge the touch sensing electrodes in order to implement the touch control function of the entire touch area.

The first fingerprint recognizing electrodes 41 and the second fingerprint recognizing electrodes 42 are disposed in the same layer. The first fingerprint recognizing electrodes 41 and the second fingerprint recognizing electrodes 42 cross to each other. The first fingerprint recognizing electrodes 41 split at the crossing point crossing to the second fingerprint recognizing electrodes.

Shapes of the first fingerprint recognizing electrodes 41 and the second fingerprint recognizing electrodes 42 are rhombuses. More particular, the first fingerprint recognizing electrodes 41 arranged in the longitudinal direction are a plurality of interconnected rhombus electrodes.

The second fingerprint recognizing electrodes 42 arranged in the horizontal direction are a plurality of interconnected electrodes.

At the intersection of the two kinds of the fingerprint recognition electrodes, the rhombus first fingerprint recognizing electrodes 41 split.

The first fingerprint recognizing electrodes 41 and the second fingerprint recognizing electrodes 42 form mutual capacitance structures.

The side length of a single rhombus touch electrode is 40 to 80 microns.

In other embodiments, the first fingerprint recognizing electrodes 41 and the second fingerprint recognizing electrodes 42 may be squares or bars.

The touch display device further includes a bridging layer 50. The bridging layer 50 includes a plurality of bridging wires arranged in an array. The bridging wires are correspondingly disposed to the split points of the first fingerprint recognizing electrodes 41. The bridging wires are utilized to connect the first fingerprint recognizing electrodes 41 split at the crossing points.

It can be understood that, in other embodiments, the second fingerprint recognizing electrode 42 cab be the one which splits at the crossing point. Correspondingly, the bridging wires are utilized to connect the second fingerprint recognizing electrodes 42 split at the crossing pints.

The first fingerprint recognizing electrode 41 are fingerprint recognition driving electrodes. The second fingerprint recognizing electrodes 42 are fingerprint recognition sensing electrodes. In other embodiments, the first fingerprint recognizing electrodes 41 are fingerprint recognizing sensing electrodes, and the second fingerprint recognizing electrodes 42 are fingerprint recognizing drive electrodes.

The first fingerprint recognizing electrodes 41 and the second fingerprint recognizing electrodes 42 are disposed in the same layer as the touch driving electrodes 32. During the manufacturing processes, the three kinds of electrodes can be manufactured in the same process and the electrode can be patterned by a masking process so that manufacturing processes are simplifying.

Figure 5:
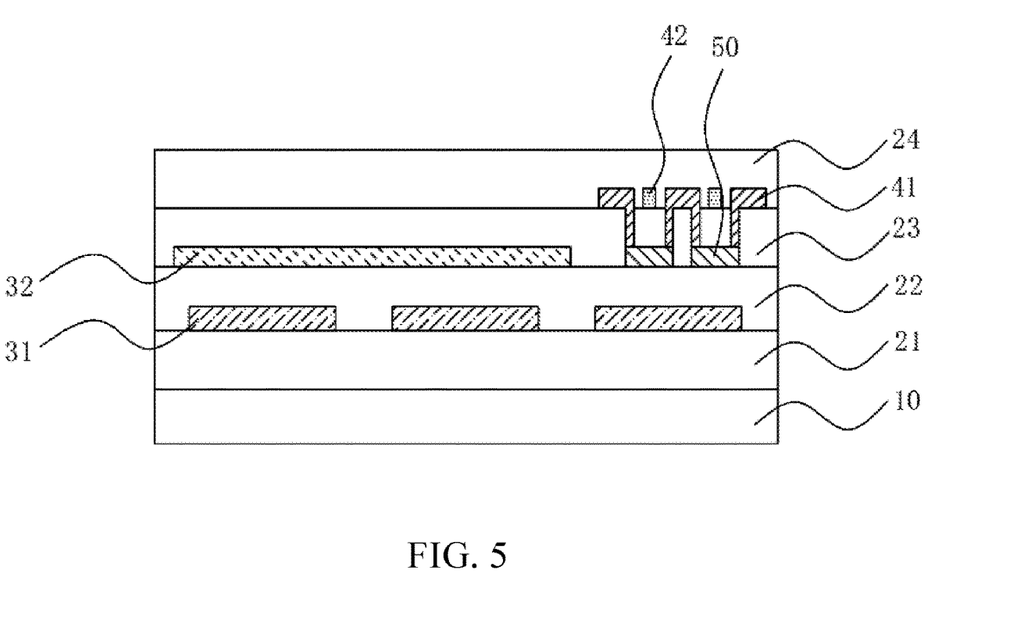
FIG. 5 illustrates another structural diagram of a touch display device of an embodiment of the present disclosure.

As shown in FIG. 5, the first fingerprint recognizing electrodes 41 are disposed on a layer differ from a layer which that the second fingerprint recognizing electrodes 42 and the touch driving electrodes 32 are disposed on.

The first fingerprint recognizing electrodes 41 and the second fingerprint recognizing electrodes are disposed on a side close to a light-emitting side of the display panel to reduce a distance between the fingerprint recognizing layer 40 and a finger. Thus, inductance is increased.

The touch display device further includes a multiple layers of insulating layers for isolating different metal layers in order to insulate electrodes in adjacent layers.

Specifically, as shown in FIG. 1, the plurality of insulating layers are a first insulating layer 21, a second insulating layer 22, a third insulating layer 23, and a fourth insulating layer 24.

The first insulating layer 21 is disposed on the display panel 10. The plurality of the touch sensing electrodes 31 are disposed on the first insulating layer 21. The first insulating layer 21 is utilized to insulate the touch sensing electrodes 31 from the circuits on the display panel 10 to avoid signal interference.

The second insulating layer 22 is disposed on the touch driving electrodes 32 and covers the touch driving electrodes 32. The plurality of the feel driving electrodes 32, the plurality of the first fingerprint recognizing electrodes 41, and the plurality of the second fingerprint recognizing electrodes 42 are disposed on the second insulating layer 22.

The third insulating layer 23 is disposed on the touch driving electrodes 32. Portions of the third insulating layer 23 corresponding to the crossing points is provided with a via hole to expose a surface portion of the first fingerprint recognizing electrodes 41, departing from the display panel 10, split at the crossing points.

The bridging layer 50 is disposed on the third insulating layer and contact the first fingerprint recognizing electrodes 41 split at the crossing points through the via holes in the third insulating layer 23. That is, each bridging wires in the bridging layer 50 contacts the first fingerprint recognizing electrodes 41 split at the crossing points arranged along the first direction (longitudinal direction).

The fourth insulating layer 24 is disposed on the bridging layer 50 and covers the bridging layer 50 to insulate the touch layer 30 and the fingerprint recognizing layer 40 from the outer side.

In other embodiments, the touch sensing electrodes 31 may be disposed above the touch driving electrodes 32.

As shown in FIG. 5, in other embodiments, the bridging layer 50 is disposed in the same layer as the touch driving electrodes 32.

The bridging layer 50 do not overplay with the touch driving electrodes 32. The fingerprint recognizing layer 40 is disposed above the bridging layer 50.

The touch display device 100 further includes a touch control circuit board 60 and a fingerprint recognizing control circuit board 70 disposed in a bezel area of the display panel, a plurality of first peripheral wires 80, and a plurality of second peripheral wires 90. The first peripheral wires are utilized to connect the touch driving electrodes 32 arranged in the longitudinal direction and the touch sensing electrodes 31 arranged in the horizontal direction to the touch control circuit board 60. The second peripheral wires 90 are utilized to connect the first fingerprint recognizing electrodes 41 arranged in the longitudinal direction and the second fingerprint recognizing electrodes 42 arranged in the horizontal direction to the fingerprint recognizing control circuit board 70.

In order to avoid metal lines are arranged too intensive, the touch control circuit board 60 and the fingerprint recognizing control circuit board 70 may be disposed in different side of the bezel of the display panel 10.

For example, the touch control circuit board 60 is disposed in an upper side of the bezel of the display panel 10 while the fingerprint recognizing control circuit board 70 is disposed in a lower side of the bezel of the display panel 10.

The first peripheral wires 80 and the second peripheral wires 90 are transparent conductive materials or metallic materials.

Figure 7:
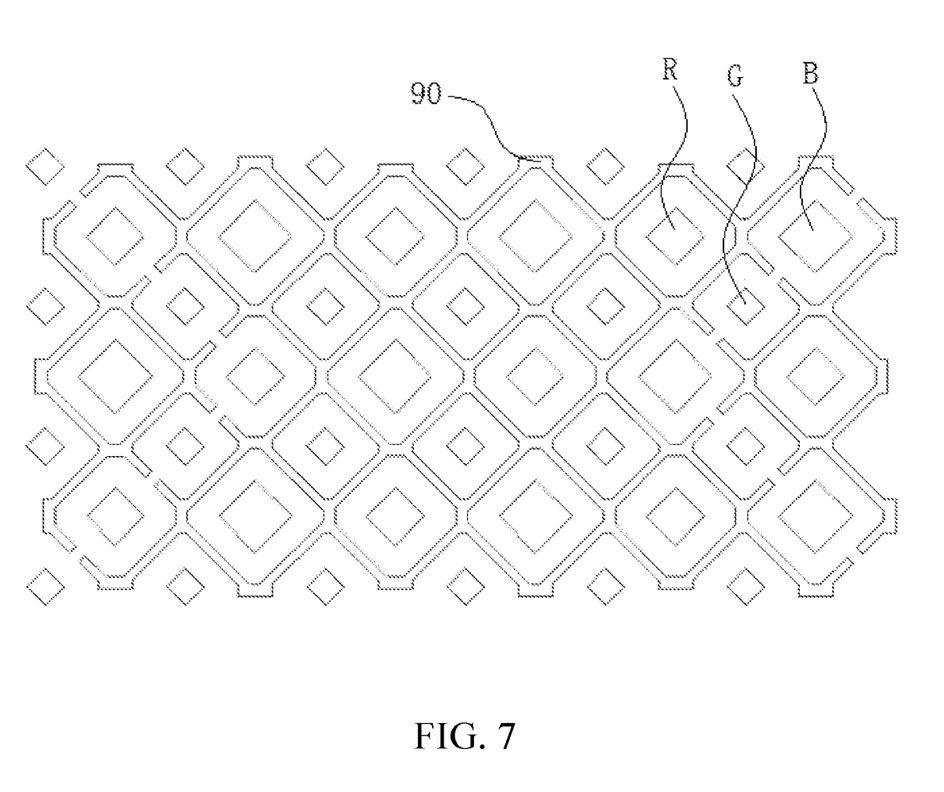
FIG. 7 illustrates a structural diagram of a second peripheral wire of the embodiment of the present disclosure.

As shown in FIG. 7, the fingerprint recognizing layer 40 is disposed in the touch control area corresponding to the display area of the display panel 10. If the second peripheral wires 90 are made of a metal material, the second peripheral wires 90 will block the light passing through the display area.

Therefore, the second peripheral wires 90 are disposed out of the light emitting area on the display panel 10. The second peripheral wires 90 are disposed in non-illuminating areas between any two of red, green, and blue pixels of the display panel 10 in order to prevent the light being blocked by the second peripheral wires 90.

Figure 4:
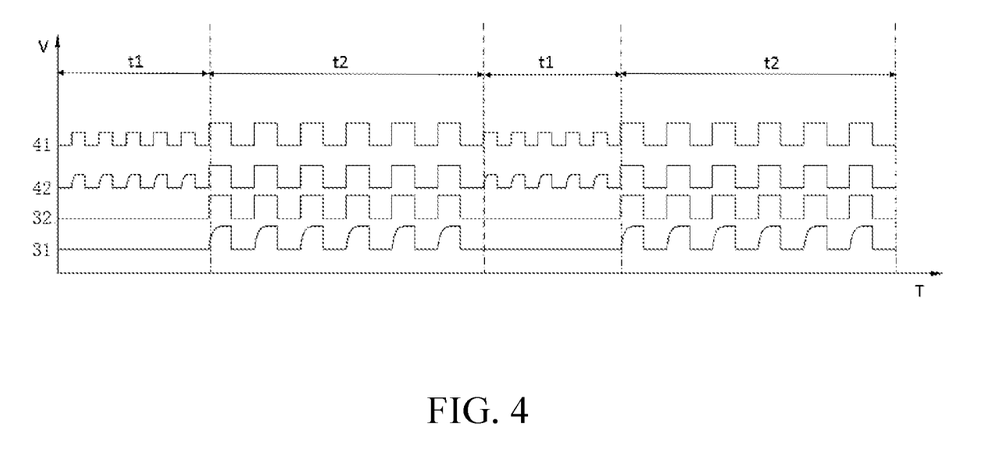
FIG. 4 illustrates a sequence diagram when operating fingerprint recognizing and touch control functions of the embodiments of the present disclosure.

As shown in FIG. 4, in a duration t1, the fingerprint recognition function is implemented, and pulse voltage is provided to the first fingerprint recognizing electrode 41 (fingerprint recognizing driving electrode). At this time, a capacitance formed by the second fingerprint recognizing electrodes 42 (fingerprint recognizing sensing electrode) and the first fingerprint recognizing electrodes 41 is charged. In the duration t1, the touch driving electrodes 32 and the touch sensing electrodes 31 are grounded thus the fingerprint recognition circuit operates normally.

After entering a duration t2, the fingerprint recognition function is disabled, and the touch control function is implemented. At this time, the same driving voltages are applied to the first fingerprint recognizing electrodes 41, the second fingerprint recognizing electrodes 42, and the touch driving electrodes 32. The fingerprint recognition circuit operates the same function as a touch driving electrode in the touch control circuit for charging the touch sensing electrodes 31 so that the fingerprint recognition circuit can also perform touch control function normally.

In the embodiment, the driving voltage applied on the first fingerprint recognizing electrodes 41 and the second fingerprint recognizing electrodes 42 are the same as the voltage applied on the touch driving electrodes 32.

In other embodiments, in the duration t2, a period and an amplitude of square pulse applied on the first fingerprint recognizing electrodes 41 and the second fingerprint recognizing electrodes 42 may be inconsistent with the square pulse applied on the touch driving electrodes 32. The pulses applied on the first fingerprint recognizing electrodes 41, the second fingerprint recognizing electrodes 42, and the touch driving electrodes 32 are not limited by this embodiment.

The above-mentioned insulating layer material is an organic insulating material or an inorganic insulating material.

The above-mentioned electrode material and bridging material may be gold, silver, copper, lithium, sodium, potassium, magnesium, aluminum, zinc and combination of any of above materials, and conductive metal materials such as indium tin oxide, aluminum-doped zinc oxide, ytterbium-doped oxide Tin, and combination of any of above materials may also be adopted.

The beneficial effects are increasing ratio of display screen to display panel by integrating the fingerprint recognition circuit into the touch circuit and making the fingerprint recognition electrodes operate as parts of the touch driving electrodes without affecting the fingerprint recognition and the touch control function.

To conclude, although the present disclosure has been disclosed by above-mentioned preferred embodiments, the above-mention preferred embodiment is not limitations to the present disclosure. Variations and modifications can be obtained by a person skilled in the art can make without departing from the aspect and scope of the present disclosure. Therefore the protected scope of the present disclosure is subject to the scope defined by the claims.

What is claimed is:

1. A fingerprint recognizable touch display panel, comprising:
    a display panel comprising a touch area defined on the display panel;
    a touch layer disposed in the touch area of the display panel and comprising a plurality of touch driving electrodes arranged in a first direction and a plurality of touch sensing electrodes arranged in a second direction;
    a fingerprint recognizing layer disposed in the touch area of the display panel and comprising a plurality of first fingerprint recognizing electrodes arranged in the first direction and a plurality of second fingerprint recognizing electrodes arranged in the second direction;
    a touch control circuit board and a fingerprint recognizing control circuit board both disposed in a bezel area of the display panel; and
    a plurality of first peripheral wires and a plurality of second peripheral wires, wherein
    the first peripheral wires are configured to connect the touch driving electrode and the touch sensing electrodes to the touch control circuit board, and the second peripheral wires are configured to connect the first fingerprint recognizing electrodes and the second fingerprint recognizing electrodes to the fingerprint recognizing circuit board;
    the second peripheral wires are disposed in non-illuminating areas between any two of red, green, and blue pixels of the display panel;
    the first fingerprint recognizing electrodes and the second fingerprint recognizing electrodes do not overlap along a thickness direction of the display panel, and the first fingerprint recognizing electrodes and the second fingerprint recognizing electrodes are both multiplexed into the touch driving electrodes in response to a touch function being operated;
    the first fingerprint recognizing electrodes and the second fingerprint recognizing electrodes are disposed on a same layer, the first fingerprint recognizing electrodes cross to the second fingerprint recognizing electrodes, and the first fingerprint recognizing electrodes are split at crossing points crossing to the second fingerprint recognizing electrodes;

wherein when a fingerprint recognition function of the fingerprint recognizable touch display panel is disabled and a touch control function of the fingerprint recognizable touch display panel is implemented, driving voltages applied on the first fingerprint recognizing electrodes and the second fingerprint recognizing electrodes are same as a voltage applied on the touch driving electrodes, wherein a period and an amplitude of a square pulse applied on the first fingerprint recognizing electrodes and the second fingerprint recognizing electrodes are inconsistent with a period and an amplitude of a square pulse applied on the touch driving electrodes.

2. The fingerprint recognizable touch display panel according to claim 1, wherein the first fingerprint recognizing electrodes, the second fingerprint recognizing electrodes, and the touch driving electrodes are disposed on a same layer.

3. The fingerprint recognizable touch display panel according to claim 1, wherein the first fingerprint recognizing electrodes and the second fingerprint recognizing electrodes are disposed on a layer different from the touch driving electrodes, and the first fingerprint recognizing electrodes and the second fingerprint recognizing electrodes are disposed close to a light-emitting side of the display panel.

4. The fingerprint recognizable touch display panel according to claim 1, wherein the touch driving electrodes are disposed on a layer different from the touch sensing layer electrodes.

5. The fingerprint recognizable touch display panel according to claim 1, further comprising a bridging layer comprising a plurality of bridging wires arranged in an array and configured to connect the first fingerprint recognizing electrodes split at the crossing points.

6. The fingerprint recognizable touch display panel according to claim 1, wherein the touch control circuit board and the fingerprint recognizing circuit board are disposed in the bezel area of different sides of the display panel.

7. The fingerprint recognizable touch display panel according to claim 1, wherein shapes of the first fingerprint recognizing electrodes, the second fingerprint recognizing electrodes, the touch driving electrodes, and the touch sensing electrodes are rhombuses or bars.

8. A fingerprint recognizable touch display panel, comprising:
a display panel comprising a touch area defined on the display panel;
a touch layer disposed in the touch area of the display panel and comprising a plurality of touch driving electrodes arranged in a first direction and a plurality of touch sensing electrodes arranged in a second direction;
a fingerprint recognizing layer disposed in the touch area of the display panel and comprising a plurality of first fingerprint recognizing electrodes arranged in the first direction and a plurality of second fingerprint recognizing electrodes arranged in the second direction; and
a plurality of first peripheral wires and a plurality of second peripheral wires, wherein
the first peripheral wires are configured to connect the touch driving electrode and the touch sensing electrodes to the touch control circuit board, and the second peripheral wires are configured to connect the first fingerprint recognizing electrodes and the second fingerprint recognizing electrodes to the fingerprint recognizing circuit board;
the second peripheral wires are disposed in non-illuminating areas between any two of red, green, and blue pixels of the display panel;
the first fingerprint recognizing electrodes and the second fingerprint recognizing electrodes do not overlap along a thickness direction of the display panel, and the first fingerprint recognizing electrodes and the second fingerprint recognizing electrodes are both multiplexed into the touch driving electrodes in response to a touch function being operated;
wherein when a fingerprint recognition function of the fingerprint recognizable touch display panel is disabled and a touch control function of the fingerprint recognizable touch display panel is implemented, driving voltages applied on the first fingerprint recognizing electrodes and the second fingerprint recognizing electrodes are same as a voltage applied on the touch driving electrodes, wherein a period and an amplitude of a square pulse applied on the first fingerprint recognizing electrodes and the second fingerprint recognizing electrodes are inconsistent with a period and an amplitude of a square pulse applied on the touch driving electrodes.

9. The fingerprint recognizable touch display panel according to claim 8, wherein the first fingerprint recognizing electrodes, the second fingerprint recognizing electrodes, and the touch driving electrodes are disposed on a same layer.

10. The fingerprint recognizable touch display panel according to claim 8, wherein the first fingerprint recognizing electrodes and the second fingerprint recognizing electrodes are disposed on a layer different from the touch driving electrodes, and the first fingerprint recognizing electrodes and the second fingerprint recognizing electrodes are disposed close to a light-emitting side of the display panel.

11. The fingerprint recognizable touch display panel according to claim 8, wherein the touch driving electrodes are disposed a layer different from the touch sensing layer electrodes.

12. The fingerprint recognizable touch display panel according to claim 8, wherein
the first fingerprint recognizing electrodes and the second fingerprint recognizing electrodes are disposed on a same layer, the first fingerprint recognizing electrodes cross to the second fingerprint recognizing electrodes, and the first fingerprint recognizing electrodes are split at crossing points crossing to the second fingerprint recognizing electrodes.

13. The fingerprint recognizable touch display panel according to claim 12, further comprising a bridging layer comprising a plurality of bridging wires arranged in an array and configured to connect the first fingerprint recognizing electrodes split at the crossing points.

14. The fingerprint recognizable touch display panel according to claim 8, further comprising a touch control circuit board and a fingerprint recognizing control circuit board both disposed in a bezel area of the display panel.

15. The fingerprint recognizable touch display panel according to claim 14, wherein the touch control circuit board and the fingerprint recognizing circuit board are disposed in the bezel area of different sides of the display panel.

16. The fingerprint recognizable touch display panel according to claim 8, wherein shapes of the first fingerprint recognizing electrodes, the second fingerprint recognizing electrodes, the touch driving electrodes, and the touch sensing electrodes are rhombuses or bars.

\* \* \* \* \*